J. LINDNER.
SOD CUTTER.
APPLICATION FILED APR. 25, 1910.

997,454.

Patented July 11, 1911.

2 SHEETS—SHEET 2.

Inventor
John Lindner.

Witnesses

By C. A. Snow & Co.
Attorneys

UNITED STATES PATENT OFFICE.

JOHN LINDNER, OF WACONIA, MINNESOTA.

SOD-CUTTER.

997,454. Specification of Letters Patent. Patented July 11, 1911.

Application filed April 25, 1910. Serial No. 557,457.

*To all whom it may concern:*

Be it known that I, JOHN LINDNER, a citizen of the United States, residing at Waconia, in the county of Carver and State of Minnesota, have invented a new and useful Sod-Cutter, of which the following is a specification.

This present invention is designed to provide a novel and improved machine for cutting sod and destroying "quack grass", said machine being characterized by a wheeled frame carrying a series of cutting disks which are mounted parallel on a common shaft. The parts are so arranged that the machine can also be used as a disk plow.

It is also the object of the invention to provide in a machine of this kind improved means for regulating the depth of the cut to be made by the disks as well as certain novel structural details to be hereinafter described and claimed.

Figure 1:
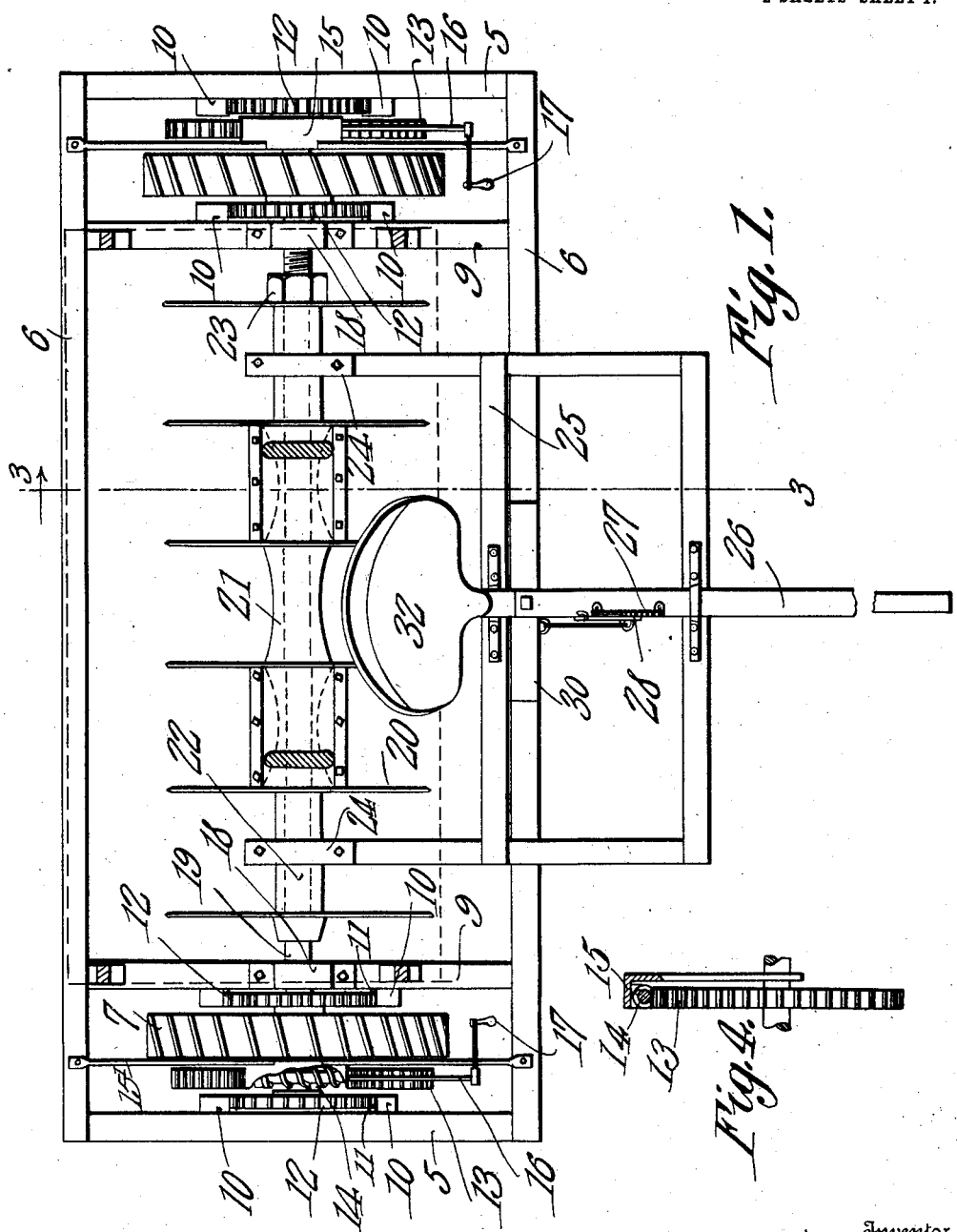
Figure 2:
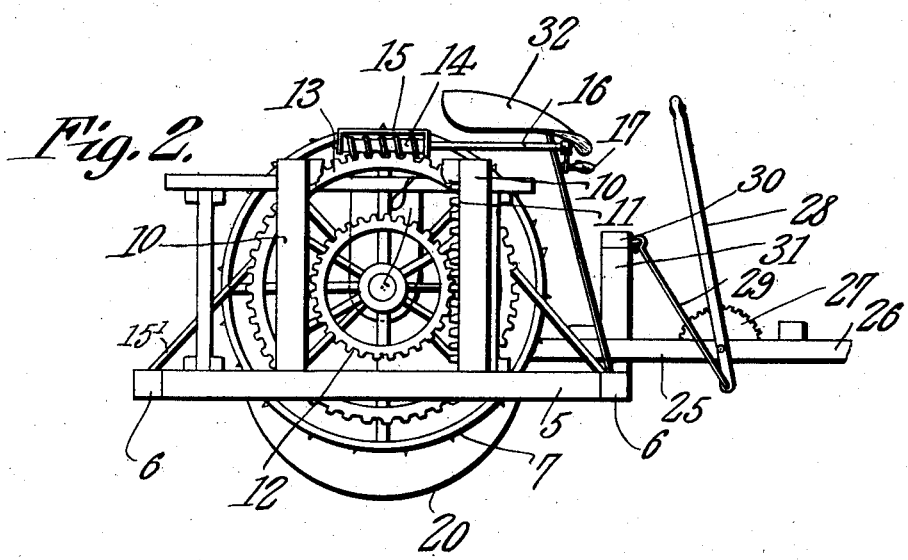
Figure 3:
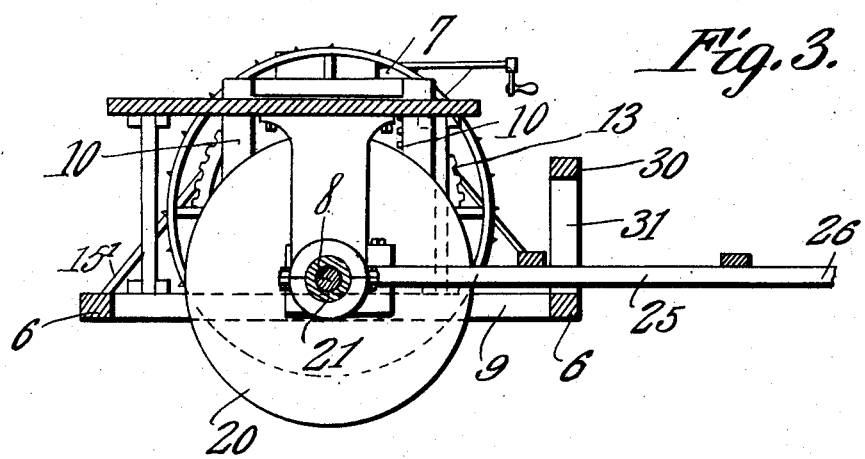

The invention is illustrated in the accompanying drawings forming a part of this specification in which, Figure 1 is a plan view of the machine. Fig. 2 is an end view, Fig. 3 is a longitudinal section on the line 3—3 of Fig. 1. Fig. 4 is a detail view of a portion of the sod cutter.

Referring to the drawings, the supporting frame of the machine comprises side beams 5, and transverse front and rear beams 6 forming a rectangular frame. This frame is supported at its ends on wheels 7 which turn loosely on stub axles 8.

From the side beams 5 and from beams 9 extending parallel thereto, rise standards 10, said standards being arranged in pairs on the beams, and on opposite sides of the wheels 7, and the forward members only of each pair have on one edge rack teeth 11 as best seen in Fig. 2 of the drawings. Between each pair of standards work pinions 12 which are engageable respectively with the rack teeth 11. The pinions 12 are keyed or otherwise made fast to the axles 8 and on said axles are also keyed or otherwise fastened worm wheels 13 which are engaged by worms 14 mounted in bearing brackets 15. The brackets 15 also support the worm shafts 16. The brackets 15 are supported upon the stub axles shafts 8 as best shown in Fig. 4 but do not rotate with the said axles. The guide rods 15′ are mounted upon the frame beams 6 and engage the shanks of the brackets 15 and hold the said brackets against tilting forwardly or rearwardly while the said brackets are free to move vertically with the axles 8.

It will be evident that when the axles 8 are rotated through the worm gearing, and the racks and pinions hereindescribed, the supporting frame is raised or lowered. The worm shafts are fitted with crank handles 17 for turning the same.

On the beams 9 are mounted bearings 18, in which is supported a transverse shaft 19 carrying a series of spaced parallel extending cutting disks 20. These disks are held in spaced relation on the shaft by sleeves 21. Near one end of the shaft is a collar 22 against which abuts the last disk of the series at this end of the shaft, and the last disk at the opposite end of the shaft is engaged by a nut 23 screwed on said shaft, whereby all the disks are clamped between the sleeves and rigidly held in place on the shaft. On two of the sleeves are mounted boxes 24 to which is connected the frame 25 of a draft tongue 26. This frame extends a short distance in front of the supporting frame of the machine, and carries a toothed sector 27 and a hand lever 28 connected at its lower end by a link 29 to a transverse beam 30 carried by standards 31 rising from the front beam 6. The purpose of this lever is to tilt the machine forwardly or rearwardly and to take the weight off the draft animals. The hand lever is provided with the usual spring latch engageable with the teeth of the sector for locking the lever.

At the front end of the supporting frame, within reach of the hand lever 28, is mounted the driver's seat 32.

In operation, the cutting disks are set to the desired depth by raising and lowering the supporting frame through the gearing herein described, the extent to which the disks extend below the wheels 7 determining the depth of the cut. This adjustment is readily made by turning the crank handles 17.

The machine can also be used as a sod cutter and a pulverizer, and by removing the disks 20 and substituting plow disks therefor, the machine may be used as a disk plow.

What is claimed is:

In an implement of the character described, a supporting frame, vertically disposed rack bars rising from the supporting frame, pinions engageable with the rack bars, stub axles carried by the pinions, ground wheels loosely mounted on the stub axles, worm wheels fast on the stub axles, worms in mesh therewith, and means for operating the worms.

In testimony that I claim the foregoing as my own, I have hereto affixed my signature in the presence of two witnesses.

JOHN LINDNER.

Witnesses:
J. EFFERTZ,
JNO. B. RANEN.

Copies of this patent may be obtained for five cents each, by addressing the "Commissioner of Patents, Washington, D. C."